United States Patent
Reiner et al.

(10) Patent No.: US 9,922,101 B1
(45) Date of Patent: Mar. 20, 2018

(54) COORDINATED CONFIGURATION, MANAGEMENT, AND ACCESS ACROSS MULTIPLE DATA STORES

(71) Applicant: EMC Corporation, Hopkinton, MA (US)

(72) Inventors: David Stephen Reiner, Lexington, MA (US); Nihar K. Nanda, Acton, MA (US); John D. Hushon, Jr., Medfield, MA (US); David R. Brown, San Marcos, CA (US); Jagannathan Ramnarayanan, Portland, OR (US)

(73) Assignee: EMC Corporation, Hopkinton, MA (US)

( * ) Notice: Subject to any disclaimer, the term of this patent is extended or adjusted under 35 U.S.C. 154(b) by 255 days.

(21) Appl. No.: 13/931,134

(22) Filed: Jun. 28, 2013

(51) Int. Cl.
*G06F 17/30* (2006.01)

(52) U.S. Cl.
CPC .. *G06F 17/30563* (2013.01); *G06F 17/30566* (2013.01)

(58) Field of Classification Search
CPC ..................... G06F 17/30563; G06F 17/30566
USPC ........................................................ 707/602
See application file for complete search history.

(56) References Cited

U.S. PATENT DOCUMENTS

| | | | |
|---|---|---|---|
| 6,901,403 B1 * | 5/2005 | Bata et al. | |
| 7,197,491 B1 * | 3/2007 | Chou et al. | |
| 7,577,640 B1 * | 8/2009 | Bland | G06F 17/30575 |
| 7,734,576 B2 * | 6/2010 | Simon | G06F 17/30563 |
| | | | 707/602 |
| 7,774,301 B2 * | 8/2010 | Johnson | G06F 17/30563 |
| | | | 707/602 |
| 8,799,207 B1 * | 8/2014 | Stolte | G06F 17/30592 |
| | | | 706/46 |
| 9,189,531 B2 * | 11/2015 | Joshi | G06F 17/30566 |
| 2002/0107957 A1 * | 8/2002 | Zargham | G06Q 10/06 |
| | | | 709/224 |
| 2002/0174122 A1 * | 11/2002 | Chou | G06F 17/30545 |
| 2003/0220901 A1 * | 11/2003 | Carr | G06F 17/30306 |
| 2004/0039727 A1 * | 2/2004 | Dessloch | G06F 17/30566 |
| 2004/0225671 A1 * | 11/2004 | Carroll | G06F 17/30563 |

(Continued)

OTHER PUBLICATIONS

Chawathe et al., "The TSIMMIS Project: Integration of Heterogeneous Information Sources", in Proceedings of the 10th Meeting of the Information Processing Society of Japan (IPSJ 1994), 1994, pp. 7-18. (Year: 1994).*

(Continued)

*Primary Examiner* — Phuong Thao Cao
(74) *Attorney, Agent, or Firm* — Daly, Crowley, Mofford & Durkee, LLP

(57) ABSTRACT

Example embodiments of the present invention relate to a method, a system, and a computer program product for federated service requests of a logical data store comprising a plurality of heterogeneous data stores. The method includes providing a data abstraction services layer as a control plane for federated service requests of a logical data store, comprising a plurality of heterogeneous data stores, by an application operating on a processing device, receiving a service request at the data abstraction services layer from the application operating on the processing device directed to the logical data store, and returning results of the service request from the data abstraction services layer to the application operating on the processing device.

21 Claims, 11 Drawing Sheets

(56) References Cited

U.S. PATENT DOCUMENTS

| | | | |
|---|---|---|---|
| 2005/0114291 A1* | 5/2005 | Becker-Szendy et al. | 707/1 |
| 2005/0149496 A1* | 7/2005 | Mukherjee | G06F 17/30528 |
| 2005/0234889 A1* | 10/2005 | Fox | G06F 17/30292 |
| 2006/0136469 A1* | 6/2006 | Dettinger | G06F 17/30427 |
| 2006/0265385 A1* | 11/2006 | Agrawal | G06F 17/30566 |
| 2008/0114770 A1* | 5/2008 | Chen et al. | 707/10 |
| 2008/0165957 A1* | 7/2008 | Kandasamy et al. | 380/44 |
| 2008/0240077 A1* | 10/2008 | Freiberger | H04L 43/0864 370/351 |
| 2008/0249981 A1* | 10/2008 | Norring | G06F 17/30566 |
| 2009/0171969 A1* | 7/2009 | Ristock | G06F 17/30566 |
| 2010/0125545 A1* | 5/2010 | Navas | G06F 17/30516 707/602 |
| 2010/0332650 A1* | 12/2010 | Aisen | H04L 43/0852 709/224 |
| 2011/0119262 A1* | 5/2011 | Dexter | G06F 17/30864 707/726 |
| 2011/0202497 A1* | 8/2011 | Marschall | G06F 17/30306 707/602 |
| 2013/0132560 A1* | 5/2013 | Hudzia | H04L 47/283 709/224 |
| 2013/0227047 A1* | 8/2013 | Dolce et al. | 709/213 |
| 2013/0339385 A1* | 12/2013 | Abrams | G06F 17/30566 707/770 |
| 2014/0089254 A1* | 3/2014 | Simon et al. | 707/609 |
| 2014/0129746 A1* | 5/2014 | Zhou | G06F 5/14 710/56 |
| 2014/0156638 A1* | 6/2014 | Joshi | G06F 17/30566 707/722 |
| 2014/0258618 A1* | 9/2014 | Novakovsky | G06F 12/0802 711/118 |
| 2014/0280457 A1* | 9/2014 | Anton | G06Q 40/08 709/202 |

OTHER PUBLICATIONS

Levy et al., "Querying Heterogeneous Information Sources Using Source Descriptions", in Proceedings of the 22nd International Conference on Very Large Data Bases (VLDB 1996), 1996, pp. 251-262. (Year: 1996).*

* cited by examiner

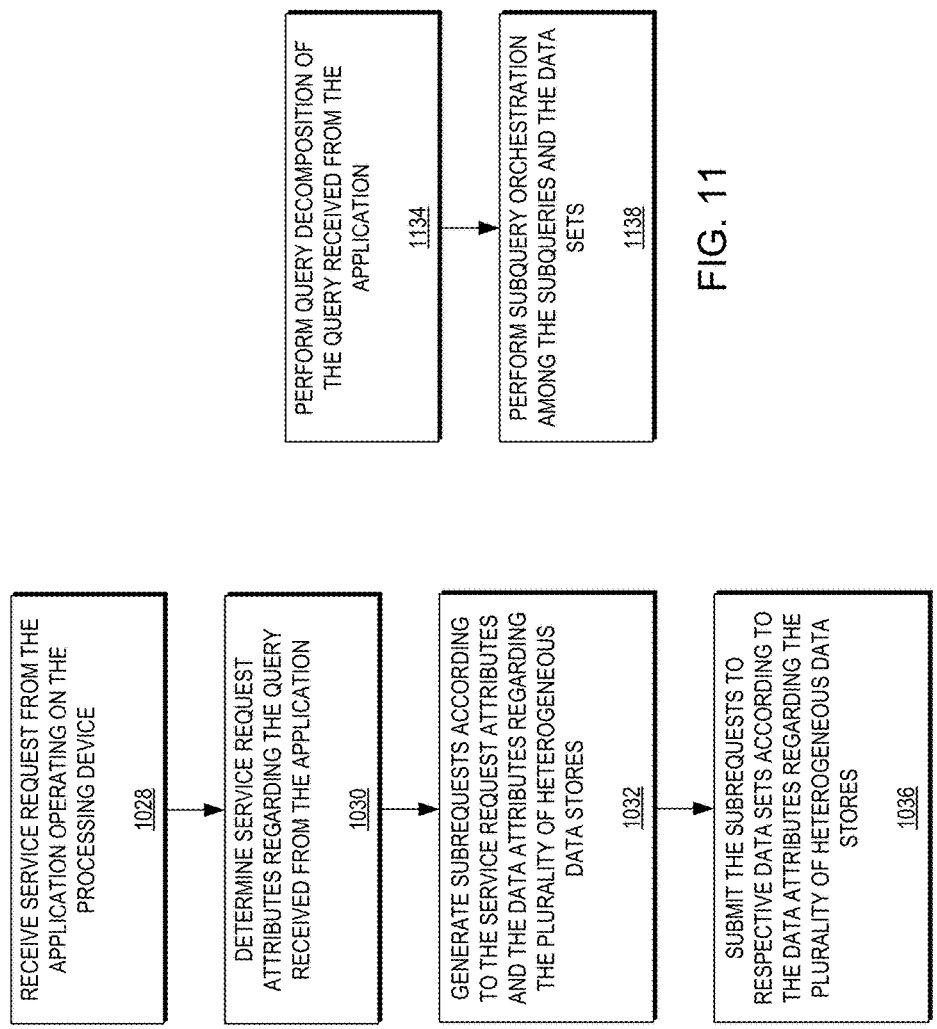

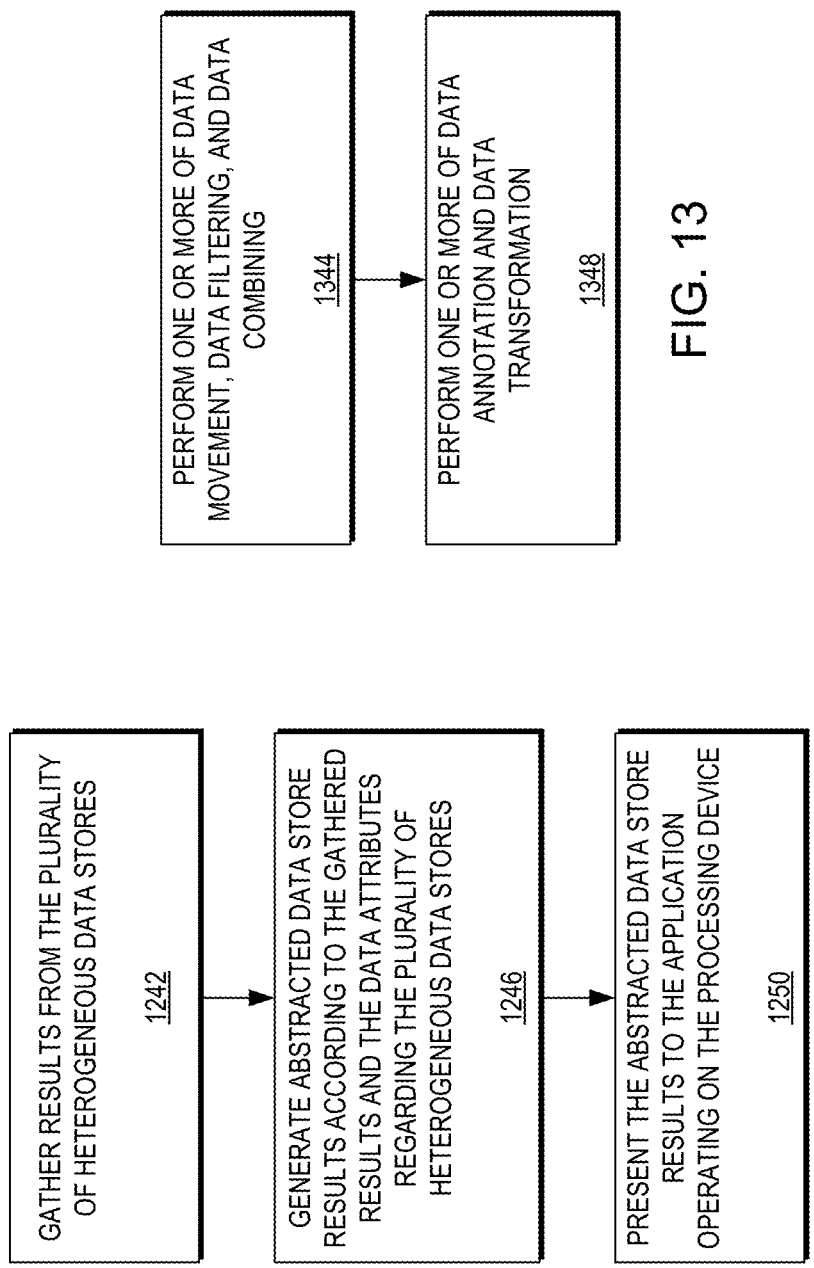

COORDINATED CONFIGURATION, MANAGEMENT, AND ACCESS ACROSS MULTIPLE DATA STORES

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATION

This application is related to U.S. patent application Ser. No. 13/728,387 entitled "MULTI LATENCY DATA MANAGEMENT" filed on Dec. 27, 2012 (now U.S. Pat. No. 9,477,691); Ser. No. 13/728,394 entitled "DATA ANALYTICS LIFECYCLE PROCESSES" filed on Dec. 27, 2012 (now U.S. Pat. No. 9,262,493); Ser. No. 13/832,412 entitled "A HOLISTIC METHODOLOGY FOR BIG DATA ANALYTICS" filed on Mar. 15, 2013 (now U.S. Pat. No. 9,798,788); and Ser. No. 13/832,422 entitled "SCALABLE MONITORING AND ERROR HANDLING IN MULTI-LATENCY DATA SYSTEMS" filed on Mar. 15, 2013 (now U.S. Pat. No. 9,600,358); the teachings of which applications are hereby incorporated herein by reference in their entirety.

TECHNICAL FIELD

The field relates to data analytics.

BACKGROUND

A wide variety of different types of data storage systems are known, including, by way of example, tiered storage systems, cloud storage systems and storage systems of virtual data centers. These and other data storage systems typically comprise one or more sets of storage devices, possibly configured in the form of storage arrays. Such data storage systems may be associated with what are generally referred to herein as "data stores" of an information processing system.

Enterprises generally want to achieve targeted performance levels from their data stores. However, this goal can be difficult to achieve in practice. For example, an enterprise may implement a single data store to store both low-latency data as well as historical data used for analytics. This type of arrangement is problematic in that the single data store cannot be optimized for both types of data.

It is also possible for an enterprise to implement two entirely separate data stores, one for low-latency data and the other for analytic data. This allows each of the data stores to be optimized for its particular type of data. However, the enterprise will generally have to provide a separate data management system for each data store. In addition, problems arise when applications running above the multiple data stores need to have data from the data stores presented to them in a consistent way. Conventional approaches such as trickle loading from the low-latency data store into the analytic data store fail to achieve consistency of the data across both data stores.

Accordingly, conventional practice is deficient in that when an enterprise uses two separate data stores for low-latency and analytic data, data management becomes increasingly complex, resulting in uneven load, query and update performance, possible gaps in data consistency, and other management difficulties.

SUMMARY

Example embodiments of the present invention relate to a method, a system, and a computer program product for federated service requests of a logical data store comprising a plurality of heterogeneous data stores. The method includes providing a data abstraction services layer as a control plane for federated service requests of a logical data store, comprising a plurality of heterogeneous data stores, by an application operating on a processing device, receiving a service request at the data abstraction services layer from the application operating on the processing device directed to the logical data store, and returning results of the service request from the data abstraction services layer to the application operating on the processing device.

BRIEF DESCRIPTION OF THE DRAWINGS

The above and further advantages of the present invention may be better under stood by referring to the following description taken into conjunction with the accompanying drawings in which:

FIGS. 10 and 11 are flow diagrams illustrating methods for receiving a service request at the data abstraction services layer directed to the logical data store according to example embodiments of the present invention;

FIGS. 12 and 13 are flow diagrams illustrating methods for returning results of the service request from the data abstraction services layer according to example embodiments of the present invention;

DETAILED DESCRIPTION

Figure 1:
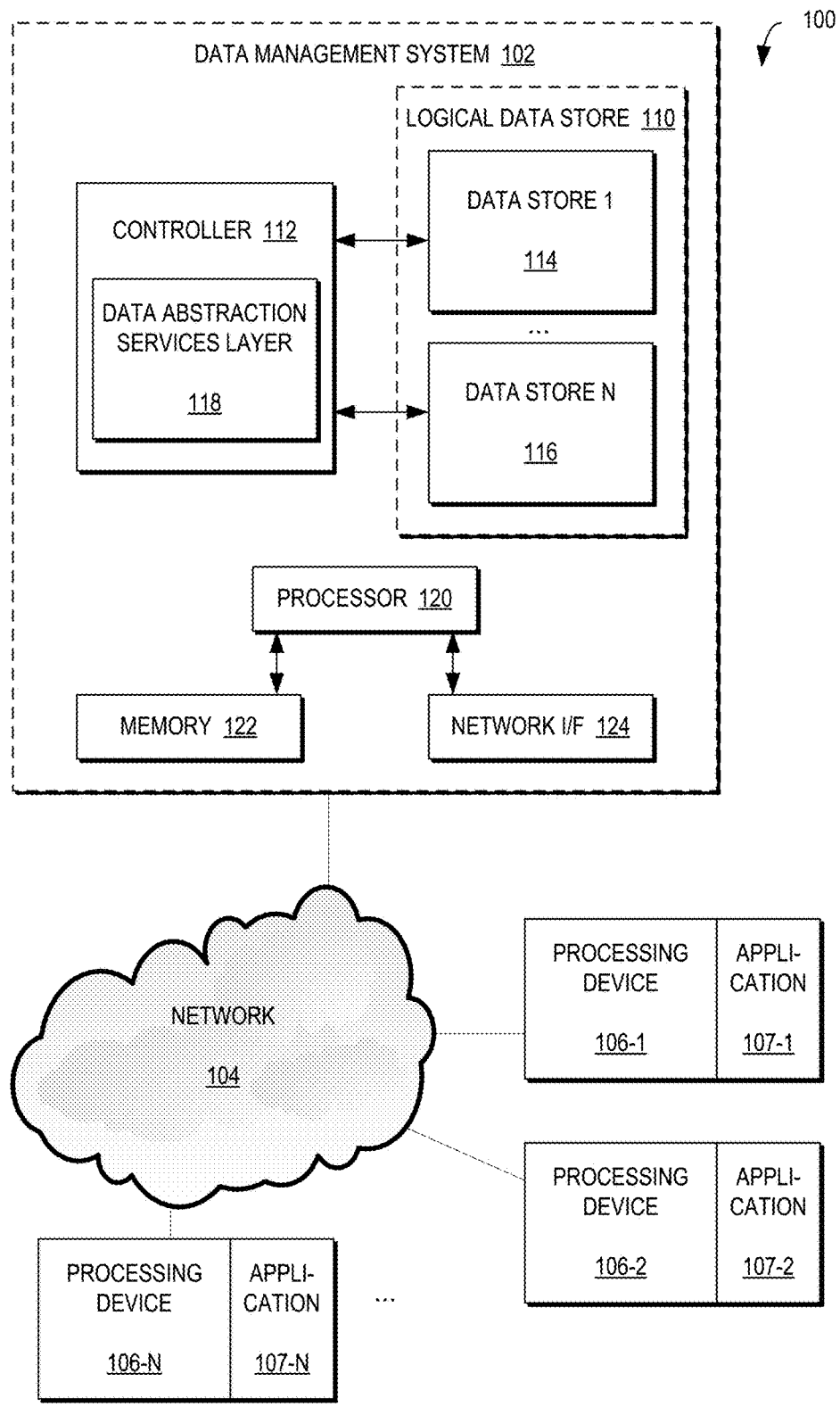
FIG. 1 is a block diagram illustrating an information processing system comprising a logical data store and an associated controller in an illustrative embodiment of the invention according to an example embodiment of the present invention.

Applications typically read and write data. Often they wish to access not just a single data store, but multiple data stores. Data is everywhere—it may be different (e.g., inconsistent) and it may be handled differently (e.g., there may be mechanisms to optimize it, improve it, and synchronize it). However, what is desired is coherent management and access across these so-called heterogeneous data stores.

Former approaches include: (1) Unifying all the data in one store, at the cost of additional latency, data movement, and data conversion; (2) Providing a formal integration schema, which is difficult above schema-less stores, and which does not handle multi-store configuration, provisioning, and management; (3) Supporting inter-store consistency specifications from within one data store, which is difficult if not impossible; (4) Supporting inter-store consistency specifications, policies, provisioning and management through application logic, which puts a large burden on application developers; (5) Providing federated query capabilities, which do not address consistency or management of the underlying data stores; (6) Partitioning multiple stores by criteria such as sharding (e.g., hashing, or time) for scale-out, which makes it difficult to support global transactions and atomic operations that span aggregates, and to support heterogeneous data models and schemas and (7) Storing data in different formats for applications built by developers who have exercised flexibility in choosing schemas (e.g., key-value, RDBMS, document, graph, etc.), which degrades query performance across multiple stores. Previous data stores are mostly concerned with routing, moving, copying, extracting, and analyzing data and ignore hiding the underlying complexity.

Example embodiments of the present invention overcome these and other disadvantages by providing a data abstraction services layer that allows multiple data sources to work together. The data abstraction services layer provides a control point for configuration of federation, query acceleration, cross-source semantic linkages, consistency reconciliation, policy management (e.g., for security), and data services for application developers. Compared to the former approaches above: (1) the costs of additional latency, data movement, and data conversion are minimized; (2) multi-store configuration, provisioning, and management can be handled (e.g., an abstraction layer above multiple data stores hides schema differences, but it also hides "no-schema" differences when NoSQL data stores are involved); (3) inter-store consistency specifications can be configured and supported; (4) there is much less burden on application developers, who can be more agile in their development approach; (5) consistency and management of the underlying data stores can be addressed; (6) transactional support can be more easily configured and supported, and also support for heterogeneous data models and schemas; and (7) analytical applications can have more freedom to run federated queries (i.e., transactions) across a set of consistent data sets regardless of the choices made for their original schemas.

To expand on this point, in a Development and Operations (i.e., DevOps) model of software development and deployment, developers have the freedom to choose the database technology for persistence. This programming flexibility for developers leads to data centers with heterogeneous data formats, which poses interoperability challenges to query processing across the data. Data abstraction services enable uniform query operation across heterogeneous data sources. Accordingly, while the complexities of dealing with multiple data sources are increasing, so is the business need for agility in incorporating new data sources, coping with their differences, defining and enforcing policies, supporting application needs for varied types of consistency, and automatically deriving and presenting a coherent view across data sources to application developers.

Illustrative embodiments of the present invention will be described herein with reference to exemplary information processing systems and associated computers, servers, storage devices and other processing devices. It is to be appreciated, however, that the invention is not restricted to use with the particular illustrative system and device configurations shown. Accordingly, the term "information processing system" as used herein is intended to be broadly construed, so as to encompass, for example, processing systems comprising private or public cloud computing or storage systems, as well as other types of processing systems comprising physical or virtual processing resources in any combination.

FIG. 1 shows an information processing system 100 configured in accordance with an illustrative embodiment of the present invention. The information processing system 100 comprises a data management system 102 that communicates over a network 104 with one or more processing devices 106-1, 106-2, . . . 106-N. The data management system 102 comprises a logical data store 110 (presented by the controller 112) that includes a controller 112, and data stores 1 114 through N 116.

The data stores 114, 116 may be heterogeneous data stores as described above. For example, data store 1 114 may be a low-latency data store 114 implemented at least in part utilizing at least one of SQLFire and GemFire, both formerly commercially available from VMware, possibly in main memory of a processing device, and data store N 116 may be a substantially higher data latency data store implemented at least in part utilizing Greenplum, formerly commercially available from the Greenplum division of EMC Corporation. Greenplum generally has a substantially higher data latency than either SQLFire or GemFire. However, these are just examples of possible implementations, and numerous other data management products may be used to implement the data stores 114 and 116 in other embodiments. For example, possible alternatives to Greenplum for implementing data store N 116 include Hadoop file system, Hive, Netezza and others, as will be readily appreciated by those skilled in the art.

The low-latency data store 114 and analytic data store 116 are therefore examples of what are more generally referred to herein as respective first and second data stores. It should be appreciated that the disclosed techniques can be applied to a wide variety of alternative data store arrangements in which there may be, for example, significant differences in data latency between two or more data stores as well as other data attributes as will be described below, such as data state, data locations, data location hierarchies, data replication, data partitioning across stores, compression, encryption, data model differences, schema differences and mappings, inter-data-store consistency management, policy definition and enforcement, performance acceleration techniques, access authorization, authentication, audit (i.e., accounting), access optimization, and query federation.

It should be noted that the term "data latency" as utilized herein in the context of a given data store is intended in a general sense. Accordingly, the term is to be construed broadly, and may refer, for example, to an average latency of contents or other measure of the latency associated with particular contents of the data store.

Also, the term "data store" as used herein is intended to be broadly construed so as to encompass, for example, systems that manage data, including database management systems that have various data models (e.g., relational, network, etc.) or that may lack a data model (e.g., key-value pairs, other NoSQL databases, etc.), as well as lower-level data managers such as a Hadoop file system and associated support for MapReduce programs.

The controller 112 is configured to manage the logical data store 110 utilizing a plurality of data sets each of which provides at least one link between at least a portion of a data set from data store 1 114 and at least a portion of a data set from the data store N 116. In the present embodiment, it is assumed that at least a subset of the data sets may comprise respective multi-latency tables, with each such multi-latency table providing at least one multi-latency link between at least a portion of a table from the low-latency data store 114 and at least a portion of a table from the analytic data store 116.

A multi-latency table is therefore an example of one type of multi-latency data set, and therefore one type of data set, and other types of multi-latency data sets (and data sets) may be used in other embodiments. Multi-latency tables are discussed in greater detail in U.S. patent application Ser. No. 13/728,387 entitled "MULTI-LATENCY DATA MANAGEMENT" filed on Dec. 27, 2012 (now U.S. Pat. No. 9,477,691) which is commonly assigned herewith and incorporated by reference herein. This is one type of abstraction that may be presented. Other types of abstractions are described in greater detail below.

A "data set" as the term is generally used herein may be viewed as an abstraction of one or more data items, such as a table, document, file, query result, key-value pairs, index, storage block contents, in-memory caches or other data item or combinations thereof, where the given data set is characterized by properties as well as relationships to other data sets. Properties and relationships of not only the data sets but also the data stores in which the data sets resides, including capabilities of those data stores, are captured by metadata attributes that are associated with the data set in the information processing system 100.

Additional details regarding exemplary data sets and metadata characterizing those data sets, as well as techniques for reasoning over such metadata, can be found in U.S. patent application Ser. No. 13/336,613, filed Dec. 23, 2011 and entitled "Managing Data Sets by Reasoning over Captured Metadata" (now U.S. Pat. No. 8,838,556) and Ser. No. 13/538,219, filed Jun. 29, 2012 and entitled "Dynamic Information Assembly for Designated Purpose Based on Suitability Reasoning over Metadata," (now U.S. Pat. No. 9,141,908) which are commonly assigned herewith and incorporated by reference herein.

Figure 5:
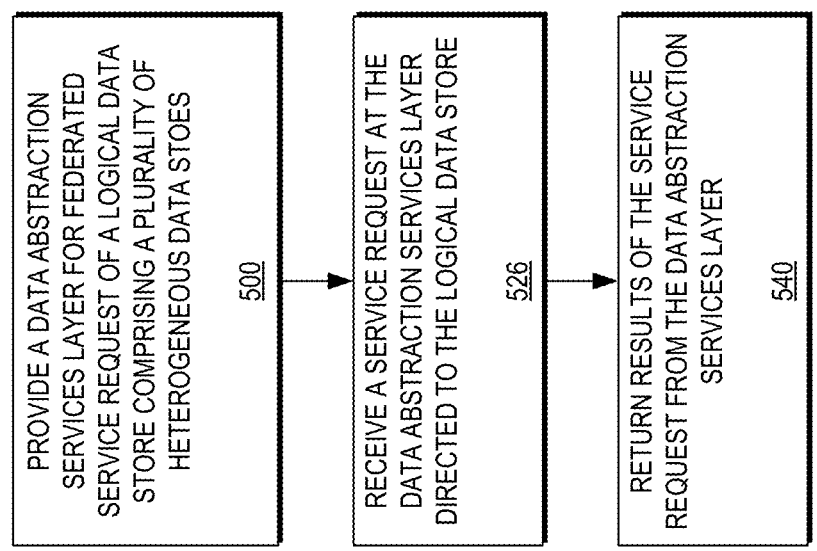
FIG. 5 is a flow diagram illustrating a method for abstracted operation of a logical data store according to an example embodiment of the present invention.

FIG. 1 may be studied in conjunction with FIG. 5 which illustrates a method for abstracted operation of a logical data store according to an example embodiment of the present invention. In the present embodiment, the controller 112 provides a data abstraction services layer 118 (500). As will be described in greater detail below, using the data abstraction services layer 118, the controller 112 may receive a service request at the data abstraction services layer from the application 107 operating on the processing device 106 directed to the logical data store 110 (526) and return results of the service request from the data abstraction services layer 118 to the application 107 operating on the processing device 106 (540).

In other words, the data abstraction services layer 118 is a type of control plane for federation of multiple data stores 114, 116. It should be understood that each data store 114, 116 understands the data sets it stores and that, based on that understanding of the data sources and their properties/methods, the control plane provided by the data abstraction services layer 118 enables performance/query acceleration, linkages across data stores, data reconciliation/consistency (e.g., between Gemfire and Greenplum), policy management, and data services for app developers (e.g., via an API or a set of primitives).

The data abstraction services layer hides data attributes or differences between data attributes across data stores. Data attributes may include data latency (e.g., inherent to Gemfire v. Greenplum); data state (e.g., streaming vs. stored); data locations (e.g., co-located v. partitioned); data location hierarchies (e.g., cache v. disk); data replication (e.g., production volume v. replica volume); data partitioning across stores (e.g., data partitioned across a first attribute, such as operating system v. data partitioned across a second attribute, such as version); compression (e.g., compressed v. uncompressed); encryption (e.g., encrypted v. unencrypted); data model differences (e.g., e.g., relational v. key-value); schema differences and mappings (e.g., "employee" v. "person"); inter-data-store consistency management (e.g., two-phase commit v. batched updates); policy definition and enforcement (e.g., "managers may see information about all employees at a lower pay grade" v. "managers may see information about their own employees only"); performance acceleration techniques (e.g., whether there is caching available); access authorization, authentication, audit (i.e., accounting) (e.g., whether such measures are in place); access optimization (e.g., "joins, inner joins, outer joins, and semi-joins supported" v. "joins supported"); and query federation (e.g., submitting one unified query against a plurality of data stores); and can provide simplified configuration, provisioning and management. The choice of replication factors across partitions, master-slave vs. peer replication, and tradeoffs under the CAP theorem (e.g., consistency, availability, potential partition) are additional dimensions subject to configuration and provisioning through data abstraction services.

The data abstraction services layer 118 hides these differences of the data stores 114, 116 and automates them in a way that allows the data abstraction services layer 118 to configure, provision, and manage the data stores 114, 116. To ensure and accomplish the configured properties and processing capabilities of the data abstraction layer, this layer uses a combination of techniques against the multiple underlying data stores. These techniques include data discovery and description, semantic analysis of data set inter-relationships, mapping of data types and instances, query optimization, query decomposition, subquery orchestration, data movement for purpose, data filtering and combining, data annotation and transformation, microbatching of loads, log scraping, and discovery and invocation of lower level services provided by individual data stores.

Figure 2:
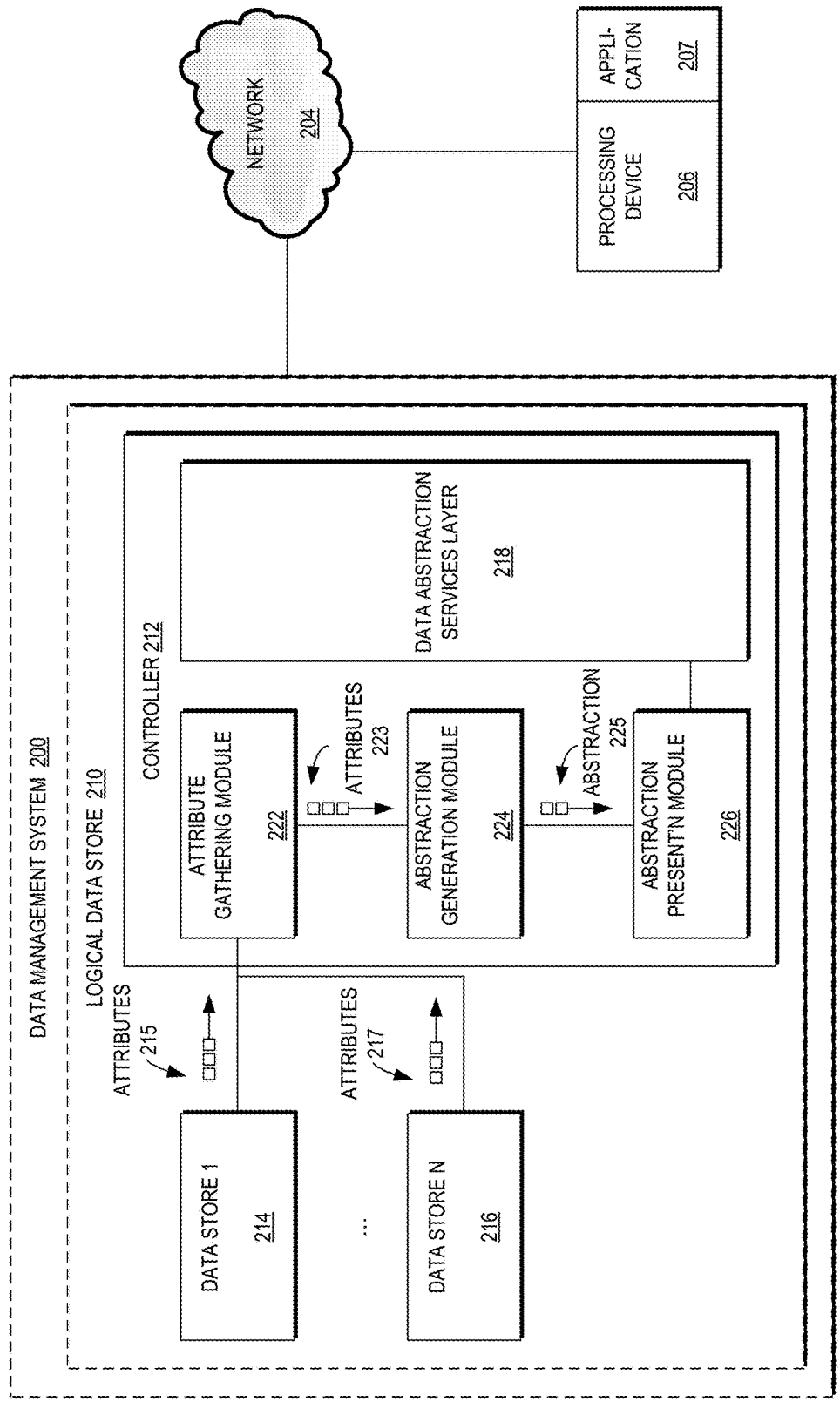
FIG. 2 is a block diagram illustrating the provision of a data abstraction services layer as a control place for federated service requests of the logical data store according to an example embodiment of the present invention.

FIG. 2 is a block diagram illustrating the provision of a data abstraction services layer 218 as a control plane for federated services requests of the logical data store 210 according to an example embodiment of the present invention. FIG. 2 may be studied in conjunction with the flow diagram of FIGS. 6-9 which are flow diagrams illustrating methods for providing a data abstraction services layer 218 as a control plane for federated service requests of the logical data store 210 according to example embodiments of the present invention.

Figure 6:
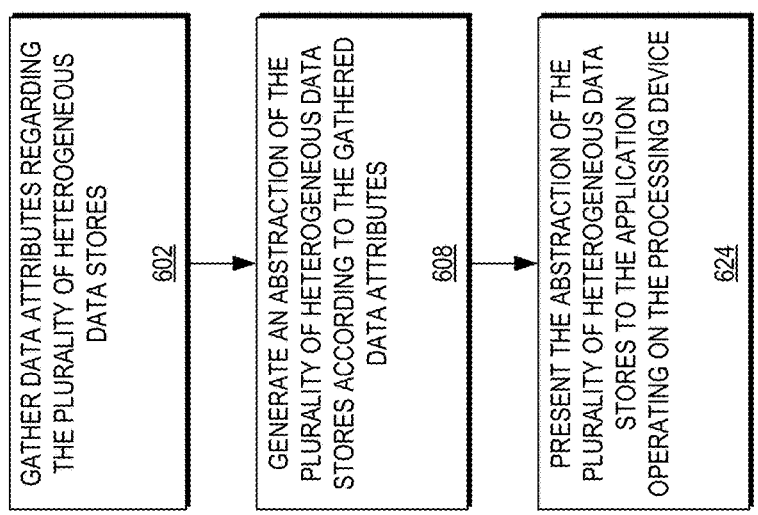

As illustrated in FIGS. 2 and 6, an attribute gathering module 222 gathers and infers data attributes 215, 217 related to a plurality of heterogeneous data stores 214, 216 and the data sets stored at those data stores (602) and forwards the data attributes 223 to an abstraction generation module 224. The abstraction generation module 224 then generates an abstraction 225 of the plurality of heterogeneous data stores 214, 216 according to the gathered data attributes (608). The abstraction presentation module 226 then may present the abstraction 225 of the plurality of heterogeneous data stores 214, 216 via the data abstraction services layer 218 to the application 207 operating on the processing device 206.

Figure 7:
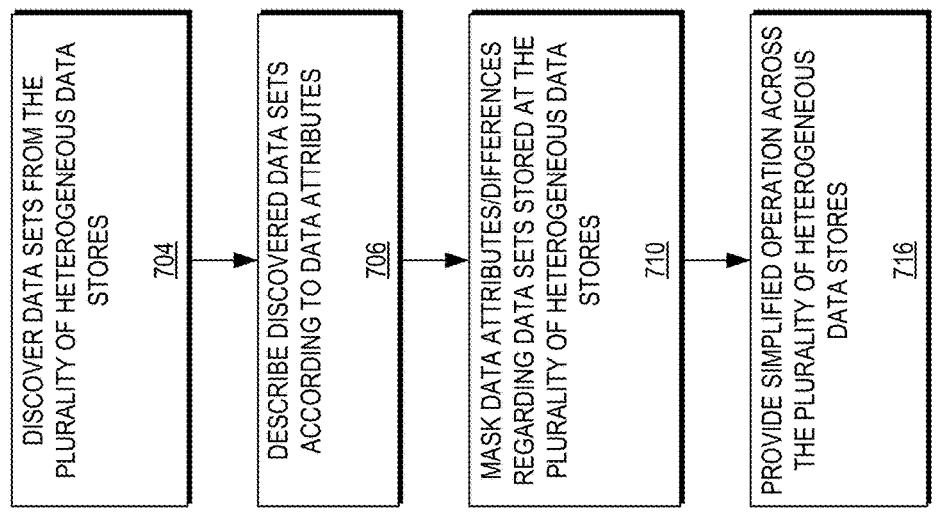
FIGS. 6-9 are flow diagrams illustrating methods for providing a data abstraction services layer as a control plane for federated service request of the logical data store according to example embodiments of the present invention.
Figure 9:
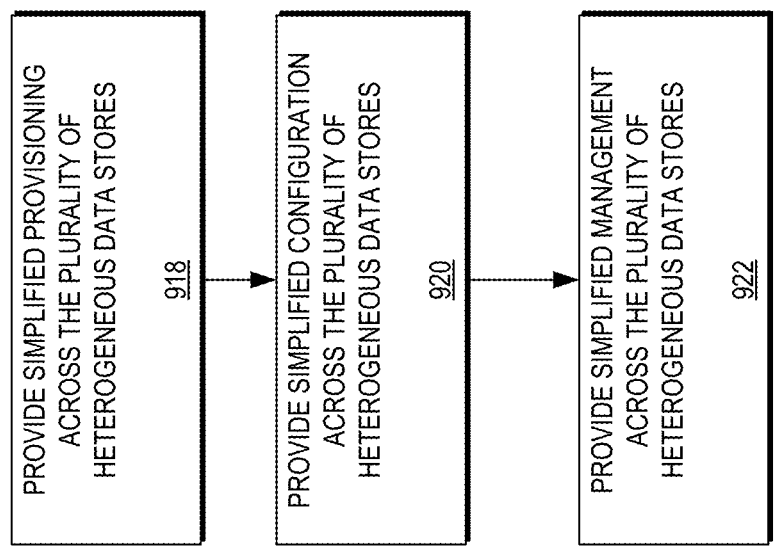
Figure 8:
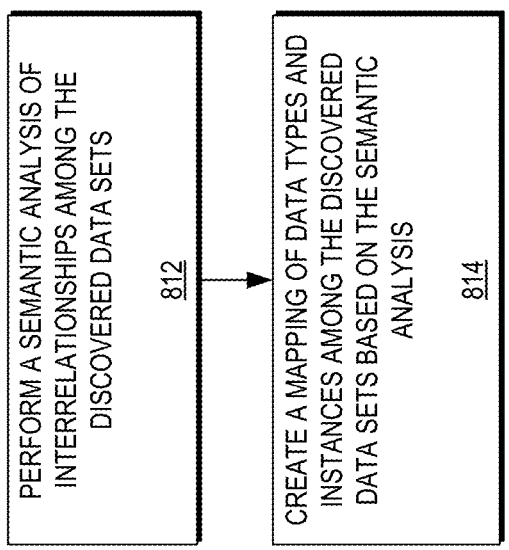

As illustrated in FIGS. 2 and 7, in certain embodiments, the attribute gathering module 222 may discover data sets from the plurality of heterogeneous data stores 214, 216 (704) and describe the discovered data sets according to the data attributes 215 (706). Additionally, the abstraction generation module 224 may mask data attributes 223 (or differences between various attributes) regarding the data stores 214, 216 and data sets at the plurality of heterogeneous data stores 214, 216 (710) and the abstraction presentation module 226 may provide simplified operation across the plurality of heterogeneous data stores 214, 216 (716). As illustrated in FIGS. 2 and 8, the abstraction generation module 224 may mask data attributes 223 by performing a semantic analysis of interrelationships among the discovered data sets (812) and creating a mapping of data types and instances among the discovered data sets based on the semantic analysis (814). Likewise, as illustrated in FIGS. 2 and 9, the abstraction presentation module 226 may provide simplified operation across the plurality of heterogeneous data stores 214, 216 by providing one or more of simplified provisioning across the plurality of heterogeneous data stores 214, 216 (918), simplified configuration across the plurality of heterogeneous data stores 214, 216 (920), and simplified management across the plurality of heterogeneous data stores 214, 216 (922).

Figure 3:
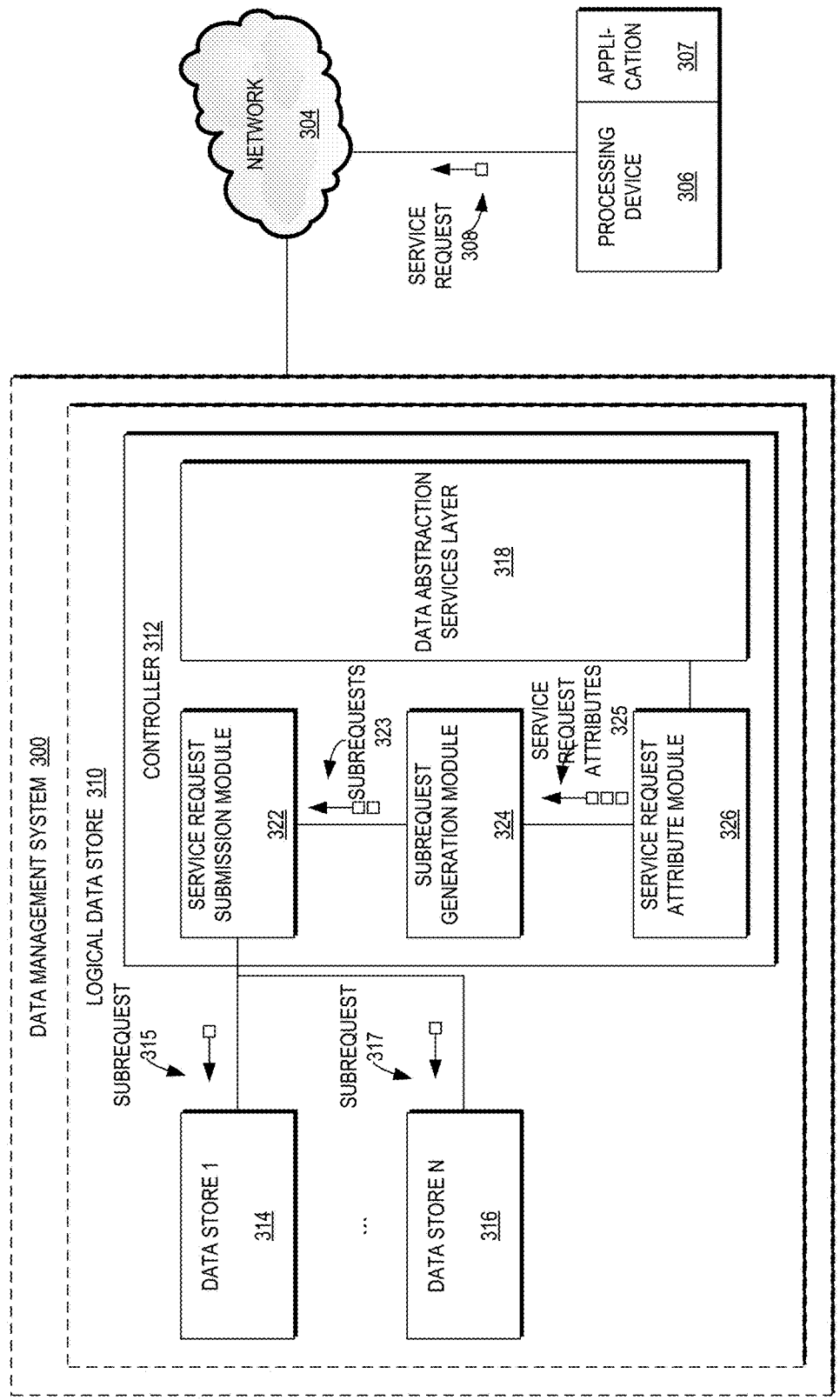
FIG. 3 is a block diagram illustrating the receipt of a service request at the data abstraction services layer from an application operating on a processing device directed to the logical data store according to an example embodiment of the present invention.

FIG. 3 is a block diagram illustrating receiving a service request at the data abstraction services layer 318 from the application 307 operating on the processing device 306 directed to the logical data store 310 according to an example embodiment of the present invention. FIG. 3 may be studied in conjunction with FIGS. 10 and 11, which are flow diagrams illustrating methods for receiving a service request 208 at the data abstraction services layer 318 directed to the logical data store 310 according to example embodiments of the present invention.

As illustrated in FIGS. 3 and 10, a service request attribute module 326 may receive, via the data abstraction services layer 318, a query 308 from the application 307 operating on the processing device 306 (1028) and determine service request attributes 325 regarding the service request 308 received from the application (1030). For example, a service request may include a query, and query attributes describe what the query is asking for (e.g., fields in tables or an average of values), where the query wants results from (e.g., table names), and under a set of conditions (e.g., temporal, location, or some other condition). For example, for a SQL query, the query attributes include SELECT items FROM sources WHERE certain conditions are true. However, it should be understood that these are only examples and query attributes should not be so limited.

The service request attribute module 326 then may forward the service request attributes 325 to a subrequest generation module 324 which may generate subrequests 323 for forwarding to a service request submission module 322 according to the service request attributes 325 and the data attributes (223 of FIG. 2) regarding the plurality of heterogeneous data stores 314, 316 (1032). The service request submission module 322 then may submit the subrequests 315 317 for respective data sets to respective data stores 314, 316 according to the data attributes regarding the plurality of heterogeneous data stores 314, 316 (1036). As illustrated in FIG. 11, for queries, to generate the subqueries, the subrequest generation module 324 may perform query decomposition of the query 308 received from the application 307 (1134) and the service request submission module 322 may perform subquery orchestration among the subqueries 315, 317 and the data sets to determine to which data stores 314, 316 each respective subquery 315,317 should be submitted (1138).

Figure 4:
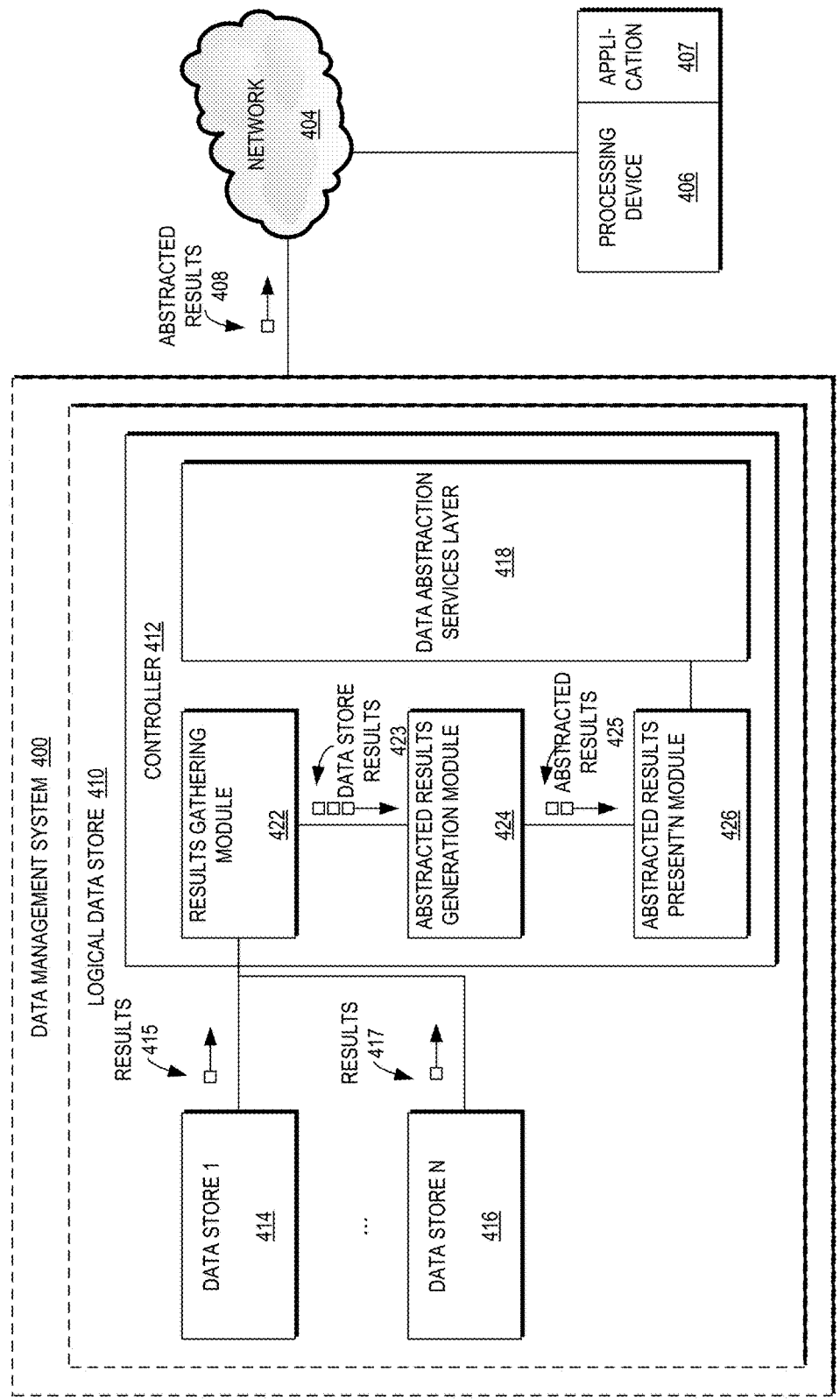
FIG. 4 is a block diagram illustrating the return of results of a service request from the data abstraction services layer to the application operating on the processing device according to an example embodiment of the present invention.

FIG. 4 is a block diagram illustrating the return of results 415, 417, 408 of a service request (as illustrated in FIG. 3) from the data abstraction services layer 418 to the application 407 operating on the processing device 406 according to an example embodiment of the present invention. FIG. 4 may be studied in conjunction with the flow diagrams of FIGS. 12-13 which are flow diagrams illustrating methods for returning results of the service request (as illustrated in FIG. 3) from the data abstraction services layer 318 according to example embodiments of the present invention.

As illustrated in FIGS. 4 and 12, a results gathering module 422 may gather results 415, 417 from the plurality of heterogeneous data stores 414, 416 (1242) and forward the results 423 for abstraction. An abstracted results generation module 424 then may generate abstracted data store results 425 according to the gathered results 415, 417 and the data attributes (215, 217 of FIG. 2) regarding the plurality of heterogeneous data stores 414, 416 (1246). The abstracted results 425 then may be presented by the abstracted results presentation module 426, via the data abstraction services layer 418, as abstracted results 408 to the application 407 operating on the processing device 406 (1250). In certain embodiments, as illustrated in FIG. 13, to gather results 415, 417 from the plurality of heterogeneous data stores 414, 416, the results gathering module 422 may perform one or more of data movement, data filtering, and data combining (1344). Likewise, in order to generate the abstracted data store results 425, the abstracted results generation module 424 may perform one or more of data annotation and data transformation (1348).

Although the controller 112 is shown in the FIG. 1 embodiment as being implemented external to the logical data store 110, in other embodiments the controller may be implemented at least in part internal to the logical data store 110. For example, it is possible to implement at least a portion of the controller 112 using other components of the data management system 102 or the data stores 114, 116 or possibly using one or more of the processing devices 106 external to the data management system. As a more particular example, the controller 112 in some embodiments may be implemented at least in part outside of the logical data store 110 and may serve as a state manager controlling behavior of one or more internal components of the logical data store 110.

The data management system 102 in the present embodiment further comprises a processor 120, a memory 122 and a network interface 124. These are assumed to be elements of at least one processing device. The data management system 102 is therefore implemented in the FIG. 1 embodiment using at least one processing device comprising a processor coupled to a memory.

The processor 120 may comprise a microprocessor, a microcontroller, an application-specific integrated circuit (ASIC), a field-programmable gate array (FPGA) or other type of processing circuitry, as well as portions or combinations of such circuitry elements.

The memory 122 may comprise random access memory (RAM), read-only memory (ROM) or other types of memory, in any combination. The memory 122 and other memories disclosed herein may be viewed as examples of what are more generally referred to as "computer program products" storing executable computer program code.

The network interfaces 124 comprise network interface circuitry that allows the data management system 102 to communicate over the network 104 with the other processing devices 106 of the information processing system 100. Such network interface circuitry may comprise, for example, one or more conventional transceivers.

The network 104 may comprise, for example, a global computer network such as the Internet, a wide area network (WAN), a local area network (LAN), a satellite network, a telephone or cable network, a cellular network, a wireless network such as WiFi or WiMAX, or various portions or combinations of these and other types of networks.

At least a portion of the logical data store 110 may comprise software that is stored in memory 122 and executed by processor 120.

Each of the processing devices 106 may similarly incorporate processor, memory and network interface elements of the type described above.

The data management system 102 and the processing devices 106 may comprise a common processing platform or multiple separate processing platforms. Such processing platforms can include virtual machines implemented using one or more hypervisors running on underlying physical infrastructure. Although shown as separate from the processing devices 106 in the present embodiment, the data management system 102 may be implemented at least in part using one or more such processing devices.

It should be understood that the particular sets of modules and other components implemented in the information processing system 100 as illustrated in FIG. 1 are presented by way of example only. In other embodiments, only subsets of these components, or additional or alternative sets of components, may be used, and such components may exhibit alternative functionality and configurations.

Figure 14:
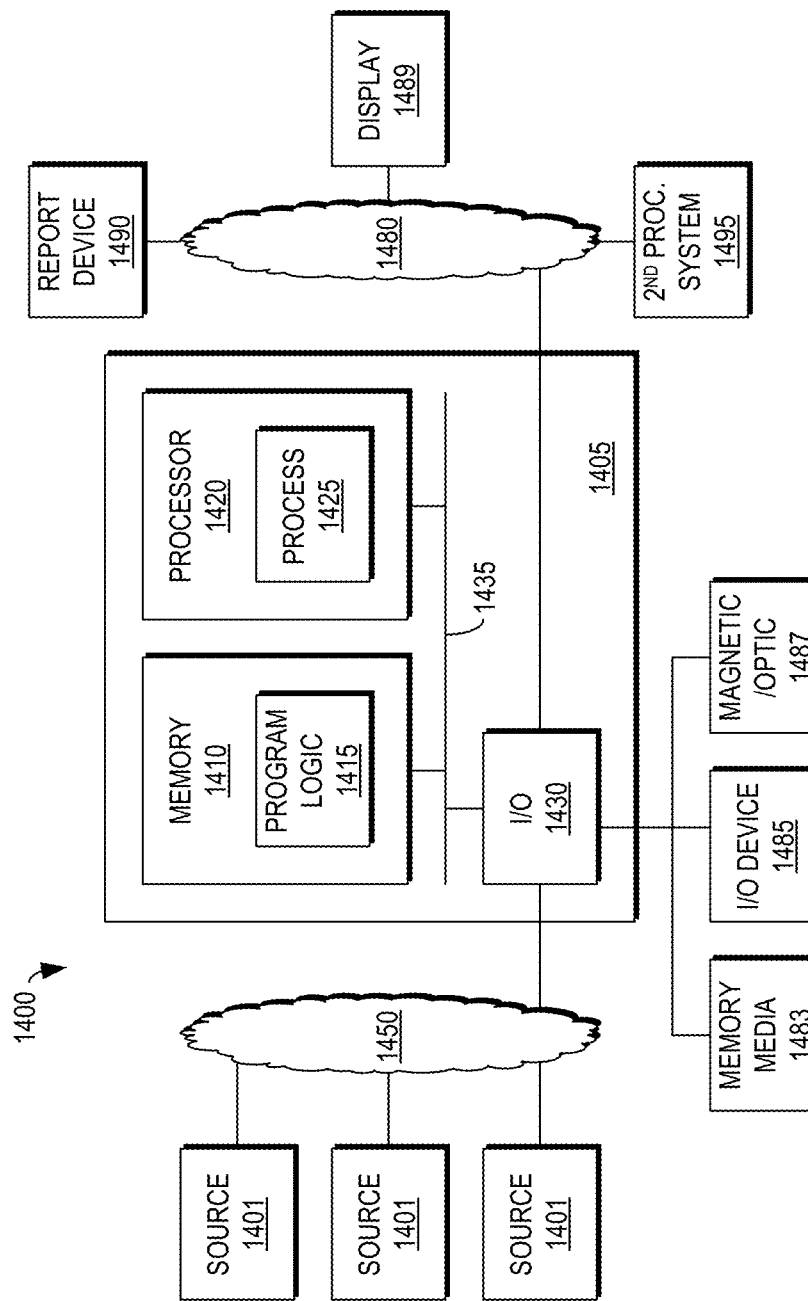
FIG. 14 is a block diagram illustrating an apparatus according to an example embodiment of the present invention.

FIG. 14 is a block diagram of an example embodiment apparatus 1405 according to the present invention. The apparatus 1405 may be part of a system 1400 and includes memory 1410 storing program logic 1415, a processor 1420 for executing a process 1425, and a communications I/O interface 1430, connected via a bus 1435.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 14, the machine becomes an apparatus for practicing the invention. When implemented on one or more general-purpose processors, the program code combines with such a processor to provide a unique apparatus that operates analogously to specific logic circuits. As such, a general purpose digital machine can be transformed into a special purpose digital machine.

Figure 15:
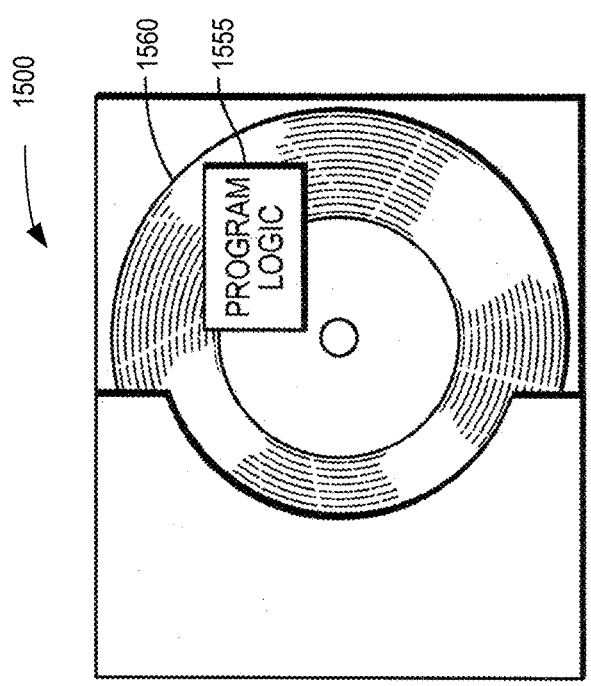
FIG. 15 is an illustration of an apparatus as embodied in program code according to an example embodiment of the present invention.

FIG. 15 shows program logic 1555 embodied on a computer-readable medium 1560 as shown, and wherein the logic 1555 is encoded in computer-executable code configured for carrying out the gas controlling process of this invention, thereby forming a computer program product 1500.

The logic for carrying out the method may be embodied as part of the aforementioned system, which is useful for carrying out a method described with reference to embodiments shown in, for example, FIGS. 1-13. For purposes of illustrating the present invention, the invention is described as embodied in a specific configuration and using special logical arrangements, but one skilled in the art will appreciate that the device is not limited to the specific configuration but rather only by the claims included with this specification.

Embodiments of the present invention have been described herein with reference to exemplary computing systems and data storage systems and associated servers, computers, storage units and devices and other processing devices. It is to be appreciated, however, that embodiments of the invention are not restricted to use with the particular illustrative system and device configurations shown. Moreover, the phrases "computing system" and "data storage system" as used herein are intended to be broadly construed, so as to encompass, for example, private or public cloud computing or storage systems, as well as other types of systems comprising distributed virtual infrastructure. However, a given embodiment may more generally comprise any arrangement of one or more processing devices.

As used herein, the term "cloud" refers to a collective computing infrastructure that implements a cloud computing paradigm. For example, as per the National Institute of Standards and Technology (NIST Special Publication No. 800-145), cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction.

Further, as used herein, the term "provisioning" may refer to the process(es) of generating and deploying one or more computing resources in a computing system, such as for example, in a cloud infrastructure environment, generating and deploying one or more virtual machines in a data center or access to a logical data store or making data stores (or their containers) available for application use.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A computer-implemented method comprising:
providing a data abstraction services layer to receive and process service requests to a logical data store from an application operating on a processing device, the service requests comprising configuration service requests, provisioning service requests, and management service requests, the logical data store comprising a plurality of heterogeneous data stores, including at least a first data store with a first latency and a second data store with a second latency different than the first latency, wherein:
the logical data store utilizes a plurality of data sets residing in the plurality of heterogeneous data stores, each respective data set providing at least one link between a portion of a first data set from the first data store and a portion of a second data set from the second data store; and a subset of the first and second data sets comprises a plurality of respective multi-latency tables, each respective multi-latency table providing at least one multi-latency link between at least a portion of a first table from the first data store and at least a portion of a second table from the second data store;

configuring the data abstraction services layer to automatically determine and present to the application a coherent view across the plurality of heterogeneous data stores, the coherent view configured to hide from the application information relating to at least a portion of the data attributes associated with the plurality of heterogeneous data stores and with the plurality of data sets, the hiding including hiding at least a portion of the data attributes relating to data latency;

receiving a service request at the data abstraction services layer from the application, the service request directed to the logical data store and including at least one of configuration service requests, provisioning service requests, and management service requests; and returning results of the service request from the data abstraction services layer to the application operating on the processing device.

2. The method of claim 1 wherein providing a data abstraction services layer comprises:

gathering data attributes regarding the plurality of heterogeneous data stores and the plurality of data sets stored at respective ones of the plurality of heterogeneous data stores;

generating an abstraction of the plurality of heterogeneous data stores according to the gathered data attributes; and presenting the abstraction of the plurality of heterogeneous data stores to the application.

3. The method of claim 2:

wherein gathering data attributes regarding the plurality of heterogeneous data stores comprises:
  discovering data sets from the plurality of heterogeneous data stores; and
  describing the discovered data sets according to the data attributes; and wherein generating an abstraction of the plurality of heterogeneous data stores according to the gathered data attributes comprises:
  masking data attributes regarding data stored in the data sets at the plurality of heterogeneous data stores; and
  providing simplified operation across the plurality of heterogeneous data stores.

4. The method of claim 3 wherein masking data attributes regarding data stored in the data sets at the plurality of heterogeneous data stores comprises:

performing a semantic analysis of interrelationships among the discovered data sets; and creating a mapping of data types and instances among the discovered data sets based on the semantic analysis.

5. The method of claim 4 wherein masking data attributes regarding data stored at the plurality of heterogeneous data stores further comprises masking at least one data attribute selected from the group consisting of:

data latency; data state; data locations; data location hierarchies; data replication; data partitioning across stores; compression; encryption; data model differences; schema differences and mappings; inter-data-store consistency management; policy definition and enforcement; performance acceleration techniques; access authorization, authentication, audit; access optimization; query federation; a choice of replication factors across partitions; master-slave vs. peer replication; and consistency, availability, and potential partition.

6. The method of claim 3 wherein providing simplified operation across the plurality of heterogeneous data stores comprises one or more of:

providing simplified provisioning across the plurality of heterogeneous data stores;

providing simplified configuration across the plurality of heterogeneous data stores; and providing simplified management across the plurality of heterogeneous data stores.

7. The method of claim 2 wherein receiving a service request at the data abstraction services layer directed to the logical data store comprises:

receiving the service request from the application operating on the processing device;

determining service, request attributes regarding the service request received from the application;

generating subrequests according to the service request attributes and the data attributes regarding the plurality of heterogeneous data stores; and submitting the subrequests to respective data sets according to the data attributes regarding the plurality of heterogeneous data stores.

8. The method of claim 7 wherein the service request comprises a query;

wherein generating subrequests according to the service request attributes and the data attributes regarding the plurality of heterogeneous data stores comprises performing query decomposition of the query received from the application; and wherein submitting the subrequests to respective data sets according to the data attributes regarding the plurality of heterogeneous data stores comprises performing subquery orchestration among the subrequests and the data sets.

9. The method of claim 2 wherein returning results of the service request from the data abstraction services layer to the application operating on the processing device comprises:

gathering results from the plurality of heterogeneous data stores;

generating abstracted data store results according to the gathered results and the data attributes regarding the plurality of heterogeneous data stores; and presenting the abstracted data store results to the application operating on the processing device.

10. The method of claim 9 wherein gathering results from the plurality of heterogeneous data stores comprises performing one or more of data movement, data filtering, and data combining; and wherein generating abstracted data store results according to the gathered results and the data attributes regarding the plurality of heterogeneous data stores comprises performing one or more of data annotation and data transformation.

11. The method of claim 1, wherein configuring the data abstraction services layer to automatically determine the coherent view further comprises:

describing at least a portion of data sets that are discovered in the plurality of heterogeneous data stores, according to respective data attributes associated with the data sets and data stores;

performing a semantic analysis of interrelationships among the discovered data sets;
creating a mapping of data types and instances among the discovered data sets based on the semantic analysis; and
masking at least a portion of the data attributes associated with at least one of the data sets and data stores.

12. A data management system comprising:
a processor;
a logical data store comprising a plurality of heterogeneous data store, including at least a first data store with a first latency and a second data store with a second latency different than the first latency, wherein:
the logical data store utilizes a plurality of data sets residing in the plurality of heterogeneous data stores, each respective data set providing at least one link between a portion of a first data set from the first data store and a portion of a second data set from the second data store; and
a subset of the first and second data sets comprises a plurality of respective multi-latency tables, each respective multi-latency table providing at least one multi-latency link between at least a portion of a first table from the first data store and at least a portion of a second table from the second data store;
memory storing computer executable code that, when executed on the processor, causes the system to provide data management, the computer executable code enabled to perform the operations of:
providing a data abstraction services layer to receive and process configuration service requests, provisioning service requests, and management service requests to the logical data store, by an application operating on a processing device;
configuring the data abstraction services layer to automatically determine and present to the application a coherent view across the plurality of heterogeneous data stores, the coherent view configured to hide from the application information relating to at least a portion of the data attributes associated with the plurality of heterogeneous data stores and with the plurality of data sets, the hiding including hiding at least a portion of the data attributes relating to data latency;
receiving a service request at the data abstraction services layer from the application, the service request directed to the logical data store, the service request selected from a group consisting of configuration service requests, provisioning service requests, and management service requests; and
returning results of the service request from the data abstraction services layer to the application operating on the processing device.

13. The method of claim 12 wherein providing a data abstraction services layer comprises:
gathering data attributes regarding the plurality of heterogeneous data stores and the plurality of data sets stored at respective ones of the plurality of heterogeneous data stores;
generating an abstraction of the plurality of heterogeneous data stores according to the gathered data attributes; and
presenting the abstraction of the plurality of heterogeneous data stores to the application.

14. The system of claim 13 wherein gathering data attributes regarding the plurality of heterogeneous data stores comprises:
discovering data sets from the plurality of heterogeneous data stores; and
describing the discovered data sets according to the data attributes; and
wherein generating an abstraction of the plurality of heterogeneous data stores according to the gathered data attributes comprises:
masking data attributes regarding data sets stored in the plurality of heterogeneous data stores; and
providing simplified operation across the plurality of heterogeneous data stores.

15. The system of claim 14 wherein masking data attributes regarding data stored in the data sets at the plurality of heterogeneous data stores comprises:
performing a semantic analysis of interrelationships among the discovered data sets; and
creating a mapping of data types and instances among the discovered data sets based on the semantic analysis.

16. The system of claim 14 wherein providing simplified operation across the plurality of heterogeneous data stores comprises one or more of:
providing simplified provisioning across the plurality of heterogeneous data stores;
providing simplified configuration across the plurality of heterogeneous data stores; and
providing simplified management across the plurality of heterogeneous data stores.

17. The system of claim 13 wherein receiving a service request at the data abstraction services layer directed to the logical data store comprises:
receiving the service request from the application operating on the processing device;
determining service request attributes regarding the service request received from the application;
generating subrequests according to the service request attributes and the data attributes regarding the plurality of heterogeneous data stores; and
submitting the subrequests to respective data sets according to the data attributes regarding the plurality of heterogeneous data stores.

18. The system of claim 17
wherein the service request comprises a query;
wherein generating subrequests according to the service request attributes and the data attributes regarding the plurality of heterogeneous data stores comprises performing query decomposition of the query received from the application; and
wherein submitting the subrequests to respective data sets according to the data attributes regarding the plurality of heterogeneous data stores comprises performing subquery orchestration among the subrequests and the data sets.

19. The system of claim 13 wherein returning results of the service request from the data abstraction services layer to the application operating on the processing device comprises:
gathering results from the plurality of heterogeneous data stores;
generating abstracted data store results according to the gathered results and the data attributes regarding the plurality of heterogeneous data stores; and
presenting the abstracted data store results to the application operating on the processing device.

20. The system of claim 19
wherein gathering results from the plurality of heterogeneous data stores comprises performing one or more of data movement, data filtering, and data combining; and wherein generating abstracted data store results according to the gathered results and the data attributes regarding the plurality of heterogeneous data stores comprises performing one or more of data annotation and data transformation.

21. A computer program product including a non-transitory computer readable medium storing computer program code that when executed on a processor of a computer causes the computer to:

provide a data abstraction services layer to receive and process service requests to a logical data store from an application operating on a processing device, the service requests comprising configuration service requests, provisioning service requests, and management service requests, the logical data store comprising a plurality of heterogeneous data stores, including at least a first data store with a first latency and a second data store with a second latency different than the first latency, wherein:

the logical data store utilizes a plurality of data sets residing in the plurality of heterogeneous data stores, each respective data set providing at least one link between a portion of a first data set from the first data store and a portion of a second data set from the second data store; and a subset of the first and second data sets comprises a plurality of respective multi-latency tables, each respective multi-latency table providing at least one multi-latency link between at least a portion of a first table from the first data store and at least a portion of a second table from the second data store;

configure the data abstraction services layer to automatically determine and present to the application a coherent view across the plurality of heterogeneous data stores, the coherent view configured to hide from the application information relating to at least a portion of the data attributes associated with the plurality of heterogeneous data stores and with the plurality of data sets, the hiding including hiding at least a portion of the data attributes relating to data latency;

receive a service request at the data abstraction services layer from the application, the service request directed to the logical data store, the service request selected from a group consisting of configuration service requests, provisioning service requests, and management service requests; and return results of the service request from the data abstraction services layer to the application operating on the processing device.

* * * * *